Figure 1:
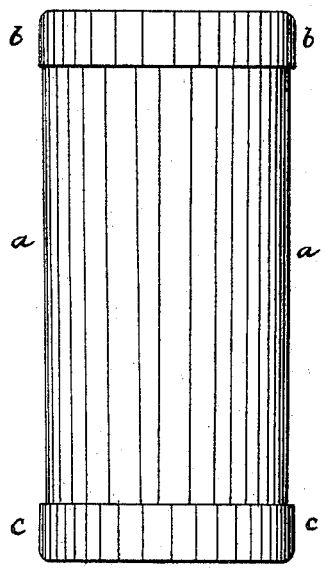

(No Model.) 2 Sheets—Sheet 1.
A. F. BIRD.
APPARATUS FOR THE MANUFACTURE OF CARD BOARD BOXES.
No. 456,878. Patented July 28, 1891.

Witnesses:

Inventor
Alfred F. Bird
by Herbert W. T. Jenner
Attorney (No Model.) 2 Sheets—Sheet 2.

A. F. BIRD.
APPARATUS FOR THE MANUFACTURE OF CARD BOARD BOXES.

No. 456,878. Patented July 28, 1891.

Witnesses:

Inventor.
Alfred F. Bird.
by Herbert W. T. Jenner.
Attorney.

UNITED STATES PATENT OFFICE.

ALFRED FREDERICK BIRD, OF BIRMINGHAM, ASSIGNOR TO THE PATENT BOX AND PRINTING COMPANY, LIMITED, OF MANCHESTER, ENGLAND.

APPARATUS FOR THE MANUFACTURE OF CARD-BOARD BOXES.

SPECIFICATION forming part of Letters Patent No. 456,878, dated July 28, 1891.

Application filed October 9, 1890. Serial No. 367,581. (No model.) Patented in England February 5, 1885, No. 1,612.

*To all whom it may concern:*

Be it known that I, ALFRED FREDERICK BIRD, a subject of the Queen of Great Britain and Ireland, residing at Birmingham, in the county of Warwick, England, have invented certain new and useful Improvements in Apparatus for the Manufacture of Paper or Card-Board Boxes, (for which a patent has been granted in Great Britain, No. 1,612, dated February 5, 1885;) and I do hereby declare the following to be a full, clear, and exact description of the invention, such as will enable others skilled in the art to which it appertains to make and use the same.

My invention has reference principally to apparatus for making paper or card-board boxes of a cylindrical figure and boxes elliptical in cross-section. My invention is, however, also applicable to boxes square in cross-section and to other forms having plain sides but with the angles rounded.

I will describe the manufacture of a cylindrical box in connection with the machinery or apparatus I employ. I make the box of three parts—namely, a cylindrical body, a cap forming the cover of the box, and a similar cap forming the bottom of the box, the latter being secured by glue or other adhesive material to one end of the body. The body is made from straw-board or other card or mill board in the ordinary way. The caps constituting the top and bottom of the box are made from circular disks of the said board, the marginal portions being damped by means of an annular damper and the said damped disks being operated upon by machinery or apparatus constituting my invention. The said machinery or apparatus consists, essentially, of a press and appliances constructed essentially in the following manner: The lower or fixed die has a central cylindrical opening of the same diameter as the exterior of the cap to be made. On the upper face of the said die is a shallow depression concentric with the cylindrical opening. The damped card-board disk is placed in the said recess with its damp face uppermost. A pressure-plate pressing upon the marginal portion of the disk is operated from the principal shaft of the press. A cylindrical plunger descending carries the disk into the cylindrical opening in the die, the puckering of the damped marginal portions being prevented by the action of the presser-plate. The said damped marginal portions of the disk are compressed between the plunger and the interior of the die and formed into a cylindrical rim. The die is surrounded by a jacket or casing, through which a stream of steam or hot water is passed, which heats the die, the heating of the said die facilitating the compression of the marginal portions of the disk and preventing any tendency to a change in the figure which has been given to it. The cap thus formed is carried by the descent of the plunger below a shoulder in the die or below three spring projections constituting a stripper-off into a bottom receiving-die, forming a continuation of the cylindrical opening in the lower die. As the plunger rises the cap is stripped from off it or is prevented from rising by the shoulder or stripper-off, and remains suspended in the bottom receiving-die until it is pushed lower down therein by the cap next formed. By the heat of the bottom receiving-die the several caps as they slowly descend in it are dried and fall from the bottom of the said die.

Figure 1 of the accompanying drawings represents a cylindrical paper or card-board box made according to my invention. The said box consists of a cylindrical body $a$, made from straw-board or other card or mill board, and end caps $b$ $c$, made from circular disks of the same material as the body $a$, the said caps $b$ $c$ being made by the machinery or apparatus hereinafter described. The end cap $b$ forms the cover or lid of the box and the other end cap $c$ the bottom of the box, the said bottom cap $c$ being secured upon the body $a$ by glue or other adhesive material.

Figure 2:
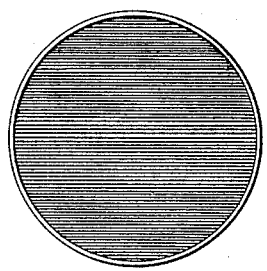
Figure 3:
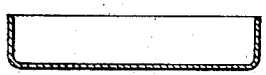
Figure 4:
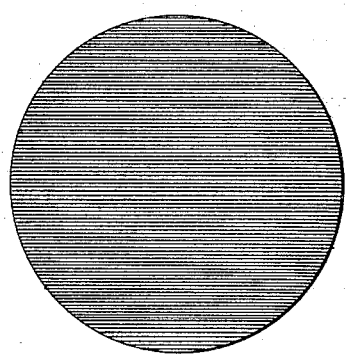

Fig. 2 represents in plan, and Fig. 3 in section, one of the end caps $b$ or $c$ separately; and Fig. 4 represents the circular disk of straw-board, card, or mill board from which the cap, Figs. 2 and 3, is made.

Figure 5:
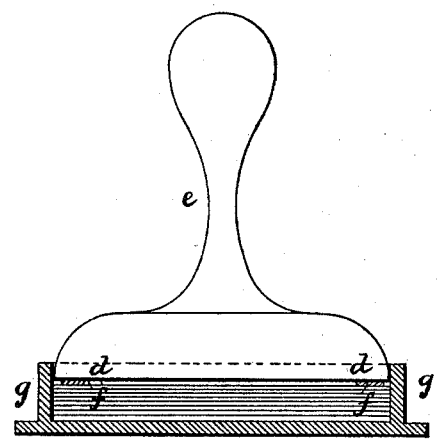
Figure 6:
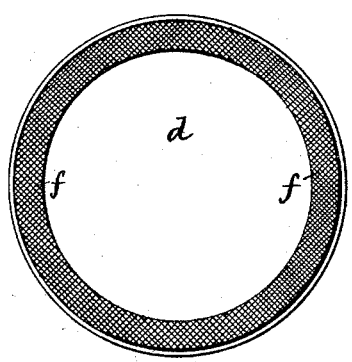
Figure 8:
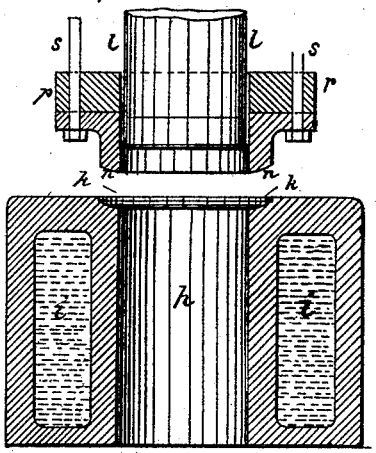

Fig. 5 represents in elevation the annular damper which I use for damping the marginal portion of the disk, and Fig. 6 is a plan of the under side of the damper. The said damper consists of a circular base $d$, provided with a handle $e$. On the marginal part of the circular base $d$ a ring of felt or other like absorbent material $f$ is fixed, as best seen in Fig. 6. The said felt ring $f$ constitutes the acting part of the annular damper. I prefer to place the disks to be damped in a circular box $g$, as represented in Fig. 5, the damper acting upon the top disk of the pile and to damp the disks by means of a solution of soap in water. The marginally-damped disks are one by one operated upon by the press or machinery represented in front elevation, partly in section, in Fig. 7, and vertical section of the dies or tools drawn to a larger scale in Fig. 8.

Figure 9:
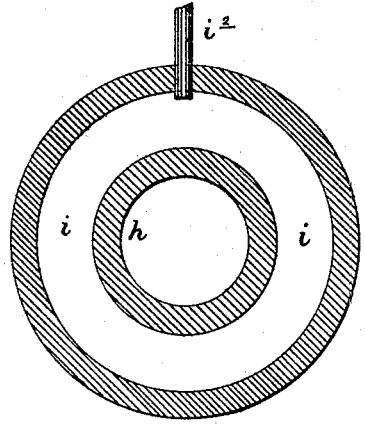
Figure 11:
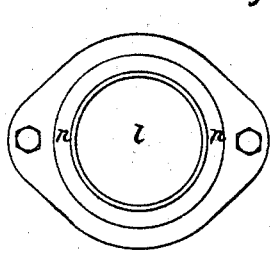
Figure 10:
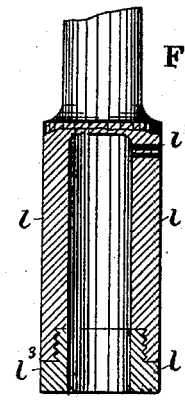
Figure 12:
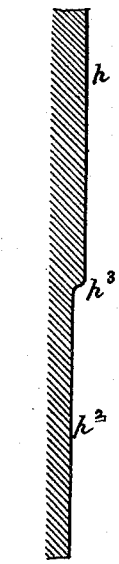

Fig. 9 represents a horizontal section of the lower or fixed die and jacket, and Fig. 10 a vertical section of the plunger or upper die or tool. Fig. 11 represents a plan of under side of the presser-plate, and Fig. 12 represents a sectional diagram of one side of the lower or fixed die on a large scale.

The same letters of reference indicate the same parts in Figs. 7, 8, 9, 10, 11, and 12.

$h\ h^2$ is the lower or fixed die surrounded by the jacket or casing $i$, through which hot water (or steam) is passed by the pipe $i^2$, the said pipe being in communication with an ordinary hot-water heating apparatus. By means of the hot water (or steam) circulating in the jacket $i$ the die $h\ h^2$ is heated. The parts $h\ h^2$ of the die are of slightly-different diameters internally, the upper or shaping part $h$ being of less diameter than the bottom or cap-receiving part $h^2$ of the die. The shoulder at the junction of the parts of the die of different diameters is situated at about the middle of the die and acts as a stripper-off, as hereinafter explained; but spring-strippers may be employed. The shoulder in the die is represented exaggerated in size in the enlarged diagram, Fig. 12, and is marked $h^3$. The said shoulder $h^3$ is so small that it cannot be satisfactorily represented in Figs. 7 and 8. At the mouth of the die $h$ is a shallow depression $k$, concentric with the cylindrical opening in the said die. $l$ is the cylindrical plunger secured to the slide $m$ of the machine, the said slide being operated by a crank or cam on the shaft of the machine. The lower or acting portion of the plunger $l$ is hollow (see Fig. 10) and has at the top of the hollow part a vent-hole $l^2$, through which any air forced into the plunger may escape. The acting or cupping end of the plunger $l$ is made of nickel-silver or other non-oxidizable metal (marked $l^3$) to prevent the said end rusting or discoloring the disk operated upon.

The nickel-silver end $l^3$ of the plunger $l$ is secured to the plunger in the manner represented in Fig. 10, or two screw-pins may be used to fix the said end $l^3$. $n$ is the presser-plate, within which the plunger $l$ slides. The under face of the said presser-plate has a figure the counterpart of that of the depression $k$ in the die $h$, and when the presser-plate is in its fully-lowered position it fills up the said depression. (See Fig. 7.) On the upper side of the presser-plate $n$ is a guide $p$, and upon the said guide is a heavy weight $q$. (Shown only in Fig. 7.) The lifting of the presser-plate $n$ and parts carried by it is effected by the slide $m$ acting upon the adjustable nuts $r\ r$ (see Fig. 7) at the top of the rods $s\ s$, the said nuts $r$ resting upon the top of the slide $m$ during portions of the stroke of the plunger $l$. The plunger $l$ and presser-plate $n$ descend in the relative positions represented in Fig. 8, and on the pressure-plate $n$ reaching and resting upon the die $h$ the plunger $l$ advances through the said presser-plate into the die $h$ for effecting the cupping operation. As the plunger advances into the die the slide $m$ retires from the nuts $r\ r$ and the now unsupported presser-plate $n$ bears by its own weight and the weight of the parts $p\ q$ carried by it upon the disk under operation.

Figure 7:
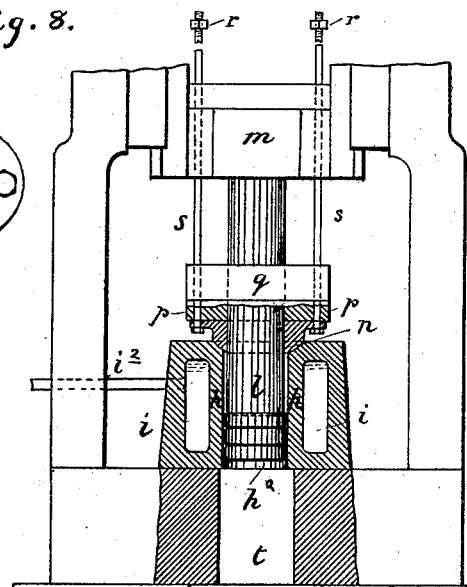

The action of the machinery is as follows: The card-board disk, having been damped in the manner hereinbefore described, is placed with its damped face uppermost in the shallow depression $k$ in the upper face of the fixed die $h$. The pressure-plate $n$ first descending presses upon the damped marginal portion of the disk, and the cylindrical plunger $l$ following carries the said disk into the cylindrical opening in the die $h$, thereby compressing the damped marginal part of the disk between the plunger and the interior of the die and forming on the disk a cylindrical rim and converting the disk into a cap, as represented in Fig. 7. As the plunger $l$ carries the disk into the die $h$, the puckering of the damped portion of the disk is prevented by the action of the pressure-plate $n$. The cap thus formed is carried by the descent of the plunger $l$ below the shoulder $h^3$ in the interior of the die and into the bottom receiving-die $h^2$ of larger diameter, in which part $h^2$ the rim of the cap expands. As the plunger $l$ rises, the cap is stripped from off it by the shoulder $h^3$, and is thereby prevented from being carried up with the plunger. The stripped-off cap remains suspended in the bottom receiving-die $h^2$ until it is pushed lower down therein by the cap next formed. By the heat of the bottom receiving-die $h^2$ the several caps as they slowly descend in it are dried and fall from or are pushed out of the bottom of the die, and passing through the opening $t$ in the bed-plate of the machine are received in a receptacle placed under the said plate, as will be understood by an examination of Fig. 7.

The machine or press may either be worked by hand or by steam or other power, and the caps forming the lid and bottom of the box may be embossed or otherwise ornamented.

What I claim is—

In a box-machine, the combination, with the lower die, of the upper die and its slide $m$, the presser-plate adapted to fit into an annular depression in the lower die, the guide $p$ and weight $q$ on top of the presser-plate, and the rods $s$, passing through the said presser-plate, guide, weight, and the slide $m$ and provided with adjustable nuts on their upper ends, substantially as and for the purpose set forth.

In testimony whereof I affix my signature in presence of two witnesses.

ALFRED FREDERICK BIRD.

Witnesses:
THOMAS MARSTON,
GEORGE BUTCHER.